(12) United States Patent
Slusarcyk et al.

(10) Patent No.: US 10,525,539 B2
(45) Date of Patent: Jan. 7, 2020

(54) COMPRESSION MILLING CUTTER WITH INDEXABLE CUTTING INSERTS

(71) Applicant: Kennametal Inc., Latrobe, PA (US)

(72) Inventors: Joseph Slusarcyk, Derry, PA (US); Thomas J. Long, II, Greensburg, PA (US); Tim J. Marshall, Latrobe, PA (US); Ronald Louis Dudzinsky, Derry, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/864,600

(22) Filed: Jan. 8, 2018

(65) Prior Publication Data
US 2019/0210124 A1    Jul. 11, 2019

(51) Int. Cl.
*B23C 5/08*    (2006.01)
*B23C 5/20*    (2006.01)
(Continued)

(52) U.S. Cl.
CPC ............... *B23C 5/202* (2013.01); *B23C 5/22* (2013.01); *B23C 5/109* (2013.01);
(Continued)

(58) Field of Classification Search
CPC ... B23C 5/202; B23C 5/22; B23C 2200/0416; B23C 5/109; B23C 2240/24; B23C 2200/168; B23C 2200/08
See application file for complete search history.

(56) References Cited

U.S. PATENT DOCUMENTS 4,529,338 A * 7/1985 Erkfritz ................. B23C 5/2265
407/35
4,934,878 A * 6/1990 Plutschuck ............. B23C 5/109
407/113
(Continued)

FOREIGN PATENT DOCUMENTS

JP    63074510 A * 4/1988
JP    63105812 A * 5/1988

OTHER PUBLICATIONS

Apr. 24, 2019 International Search Report Transmitted P17-06277-WO-PCT.

*Primary Examiner* — Sara Addisu
(74) *Attorney, Agent, or Firm* — Ian K. Samways

(57) ABSTRACT

A compression milling cutter includes a shank and a front cutting portion that terminates at a leading end of the milling cutter. The front cutting portion has a first circumferential row of one or more insert receiving pockets proximate a leading end of the milling cutter, and a second circumferential row of one or more insert receiving pockets, each insert receiving pocket configured to receive a respective indexable cutting insert. The cutting insert mounted in the first circumferential row has a positive axial rake angle, A, and the indexable cutting insert mounted in an insert pocket of the second circumferential row has a negative axial rake angle, B. Because of the different axial rake angles, chips generated during a machining operation flow in opposite directions, thereby creating a compression zone disposed between the first and second circumferential rows. This compression zone replicates the cutting action of a solid end mill, particularly when machining fiber reinforced plastic materials.

23 Claims, 8 Drawing Sheets

(51) Int. Cl.
*B23C 5/22* (2006.01)
*B23C 5/10* (2006.01)
(52) U.S. Cl.
CPC .. *B23C 2200/0416* (2013.01); *B23C 2200/08* (2013.01); *B23C 2200/168* (2013.01); *B23C 2240/24* (2013.01)

(56) References Cited

U.S. PATENT DOCUMENTS

| | | | |
|---|---|---|---|
| 4,940,369 | A | 7/1990 | Aebi et al. |
| 5,071,292 | A | 12/1991 | Satran |
| 5,383,750 | A * | 1/1995 | Satran .................. B23C 5/1072 407/113 |
| 6,203,251 | B1 | 3/2001 | Oppelt et al. |
| 6,533,506 | B1 * | 3/2003 | Hite ........................ B23B 5/167 407/36 |
| 6,939,090 | B1 * | 9/2005 | Nagaya .................... B23C 5/109 407/113 |
| 6,974,280 | B2 | 12/2005 | Satran et al. |
| 7,004,689 | B2 | 2/2006 | DeRoche et al. |
| 7,204,662 | B1 | 4/2007 | Long, II et al. |
| 9,821,382 | B2 * | 11/2017 | Daub ........................ B23C 5/06 |
| 2006/0013661 | A1 * | 1/2006 | Long, II ............. B23B 27/1622 407/113 |
| 2009/0169313 | A1 | 7/2009 | Satran |
| 2010/0221076 | A1 | 9/2010 | Takahashi et al. |
| 2011/0280673 | A1 * | 11/2011 | Degany .................. B23C 5/109 407/42 |
| 2013/0051936 | A1 * | 2/2013 | Satran ...................... B23C 5/08 407/42 |
| 2014/0212231 | A1 * | 7/2014 | Kovac .................... B23C 5/205 407/114 |

* cited by examiner

_US 10,525,539 B2_

COMPRESSION MILLING CUTTER WITH INDEXABLE CUTTING INSERTS

FIELD OF THE INVENTION

The invention relates in general to a rotary cutting tool, and in particular to a milling compression cutter with indexable cutting inserts for machining fiber reinforced plastic (FRP) material, such as carbon fiber reinforced polymer (CFRP), and the like.

BACKGROUND OF THE INVENTION

Cutting tools, such as milling cutters, are rotatable tools of cylindrical, conical, shaped or disk form, having a plurality of cutting edges. Such cutters are available in many forms, such as plain cylindrical, side milling cutters, face and end mills, formed cutters, and standard and special shaped profile cutters. High speed steel cutters are used for short production runs, inserted carbide blades are often used for long runs.

Indexable milling cutters employing cutting inserts mounted at the front end of the tool are known in the art. The indexable milling cutters can be used in several types of applications depending on the configuration of the cutting inserts mounted therein. The cutting inserts may present a peripheral cutting edge for side milling, a front cutting edge for face milling and a curved cutting edge of a so-called "ball-nose" end mill for various copying applications. Four flute milling cutters are probably the most common, but 2, 3 or 6 flutes are also used extensively. Milling cutters are widely used because they can execute a wide variety of milling operations, and the initial cost of the cutter is moderate. Shapes other than cylindrical are also in common use. The shank can be parallel or tapered, and need not necessarily be equal to the cutter teeth diameter.

Fiber reinforced plastic (FRP) materials are widely used in aerospace industry due to its high specific strength and high specific stiffness. FRP materials are composite materials consisting of soft resin matrix and high strength fiber reinforcement. Typical fiber reinforcements include carbon fibers (CFRP), glass fibers (GFRP), Kevlar fibers, and the like. FRP materials are often processed into a laminated structure. FRP materials have excellent in-plane strength, but low inter-laminar strength.

Conventional drilling also known as "push drilling" is a common practice used with metals. The drill is pressed downward along the axis of the tool to create a hole. Drilling with this method reduces side to side deflection in the metal layers. However, push drilling FRP materials, such as CFRP, and the like, is typically problematic and fiber delamination and other damage is an issue. Thus, it is desirable to use another technique other than "push drilling" for machining FRP materials.

SUMMARY OF THE INVENTION

In general, FRP materials, such as CFRP, and the like, machine best when under compression. This explains why the solid end mill works so well when machining FRP materials. Typically, solid end mills are used primarily for trimming components and producing holes. However, a solid end mill is limited by size, and tool life is often an issue when machining FRP materials. As a result, the use of solid end mill for machining FRP materials is relatively costly. Thus, it is desirable to use a less costly cutting tool, such as a milling cutting tool with indexable cutting inserts to machine FRP materials.

Embodiments of the invention are directed to addressing problems associated with machining FRP materials with a milling cutting tool with indexable cutting inserts, which is much less costly than using a solid end mill for machining FRP materials.

In one aspect of the invention, a compression milling cutter comprises a front cutting portion having a first circumferential row of one or more insert receiving pockets proximate a leading end of the milling cutter, and a second circumferential row of one or more insert receiving pockets, each insert receiving pocket configured to receive a respective indexable cutting insert. The indexable cutting insert mounted in an insert pocket of the first circumferential row has a positive axial rake angle, A, with respect to a rotational axis such that a chip generated during a machining operation is guided in a first direction. The indexable cutting insert mounted in an insert pocket of the second circumferential row has a negative axial rake angle, B, with respect to the rotation axis such that a chip generated during the machining operation is guided in a second direction opposite the first direction, thereby creating a compression zone disposed between the first and second circumferential rows.

In another aspect of the invention, a compression milling cutter comprises a front cutting portion having a first circumferential row having at least two insert receiving pockets proximate a leading end of the milling cutter, and a second circumferential row having at least two insert receiving pockets proximate the first circumferential row, each insert receiving pocket configured to receive a respective indexable cutting insert. A first cutting insert is mounted in the first circumferential row and has a first positive axial rake angle, A, and a second cutting insert of the first circumferential row has a second positive axial rake angle, A, such that chips generated by the first and second cutting inserts during a machining operation are guided in a first direction. A third cutting insert is mounted in the second circumferential row and has a first negative axial rake angle, B, and a fourth cutting insert of the second circumferential row has a second negative axial rake angle, B, such that chips generated by the third and fourth cutting inserts during the machining operation are guided in a second direction opposite the first direction, thereby creating a compression zone disposed between the first and second circumferential rows.

These and other aspects of the present invention will be more fully understood following a review of this specification and drawings.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

Figure 1:
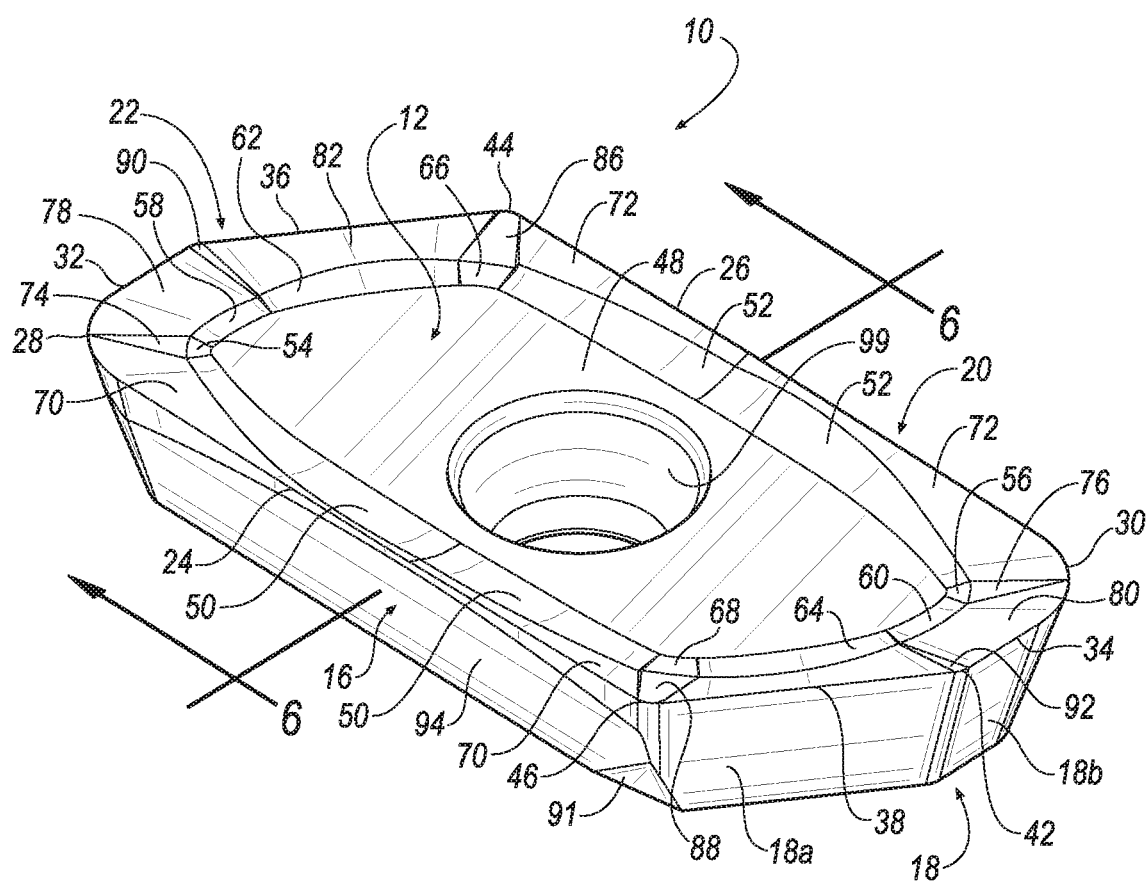
FIG. 1 shows a perspective view of a cutting insert according to an embodiment of the invention.

Referring to FIGS. 1-6, wherein like reference characters represent like elements, a cutting insert 10 is shown according an embodiment of the invention. In general, the cutting insert 10 is preferably made from a suitable material for machining FRP materials. For example, the insert 10 can be made from cemented carbide or other materials known to those skilled in the art for milling a metallic work piece (not shown), such as aluminum, or the like.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Furthermore, as used herein, the term "rake angle" is a parameter used in various cutting and machining processes, describing the angle of the cutting face relative to the work piece. There are two rake angles, namely the axial angle and the radial rake angle, both of which help to guide chip flow. There are three types of rake angles: positive, negative, and zero.

The cutting insert 10 includes generally, a top surface 12, a bottom surface 14 and side surfaces 16, 18, 20, 22. The side surface 18 is further comprised of a first side surface 18a, and a second side surface 18b that is angled less than ninety (90) degrees with respect to the first surface 18a. Similarly, side surface 20 is further comprised of sides surfaces 20a, 20b that are also angled with respect to each other. First or long cutting edges 24, 26 are defined at the intersections between the top surface 12 and the side surfaces 16, 20, respectively. Second or corner radius cutting edges 28, 30 are defined generally at the intersections between the top surface 12 and the side surfaces 16, 18, 20 and 22. Specifically, the corner radius cutting edge 28 is defined generally at the intersection of side surfaces 16, 22, and the corner radius cutting edge 30 is defined generally at the intersection of side surfaces 18, 20. Third or facet radius cutting edges 32, 34 and fourth or ramping cutting edges 36, 38 are defined generally at the intersection between the top surface 12 and the side surfaces 18, 22 respectively.

Transitional edges or radius reliefs 40, 42 are located at the corner intersection between the top surface 12 and the facet radius cutting edges 32, 34, and between the top surface and the ramping cutting edges 36, 38, respectively. Similarly, transitional edges or radius reliefs 44, 46 are located at the intersection between the top surface 12 and the ramping cutting edges 36, 38, and between the top surface 12 and the long cutting edges 24, 26, respectively. The transitional edges 40, 42, 44, 46, which is a radius in the illustrations, but would similarly satisfy the concept as any desirable shape, such as a chamfer, sharp corner, or the like.

Although other angles are within the contemplated scope of the invention, the facet radius cutting edges 32, 34 of the illustrated embodiment form an angle of approximately ninety (90) degrees with respect to the long cutting edges 24, 26. On the other hand, the ramping cutting edges 36, 38 form an angle of less than ninety (90) degrees, for example, in a range of approximately forty-five (45) degrees to approximately eighty-five (85) degrees with respect to ramping cutting edges 36, 38. A portion of the ramping cutting edge 36, 38 nearest its respective facet radius cutting edge 32, 34 can be used when the cutting insert 10 performs down ramping operations, defined as increased axial depth of cut as the tool progresses along a work piece (not shown). However, the remaining portion of the ramping cutting edge 36, 38 distal its respective facet radius cutting edge 32, 34 is a trailing edge that does not participate in the cutting of the work piece.

The top surface 12 of the cutting insert 10 also includes a substantially planar central portion 48 that is generally parallel to the substantially planar bottom surface 14. The top surface 12 further includes a plurality of rake faces and a plurality of radius blends that provide a transition for the topography of the top surface 12 between the central portion 18 and the various rake faces of the cutting insert 10. For example, the radius blends may be slightly concave in cross section to provide a transition between the substantially planar topography of the central portion 48 and the rake faces that slope upwardly to its respective cutting edge. Specifically, radius blends 50, 52 are located between the central portion 48 and the rake faces 70, 72 that slope upwardly to the long cutting edges 24, 26, respectively. Radius blends 54, 56 are located between the central portion 48 and the rake faces 74, 76 that slope upwardly to the corner radius cutting edges 28, 30, respectively. Radius blends 58, 90 are located between the central portion 48 and the rake faces 78, 80 that slope upwardly to the facet radius cutting edges 32, 34, respectively. Radius blends 62, 64 are located between the central portion 48 and the rake faces 82, 84 that slope upwardly to the ramping cutting edges 36, 38, respectively. Radius blends 66, 68 are located between the central portion 48 and the rake faces 86, 88 that slope upwardly to the transitional edges 44, 46. Note that a very small radius blend is located between the central portion 48 and rake faces that slope upwardly to the transitional edges 40, 42, respectively. The rake faces are used to effectively evacuate chips formed during milling operations with regard to the top surface 12.

Figure 2:
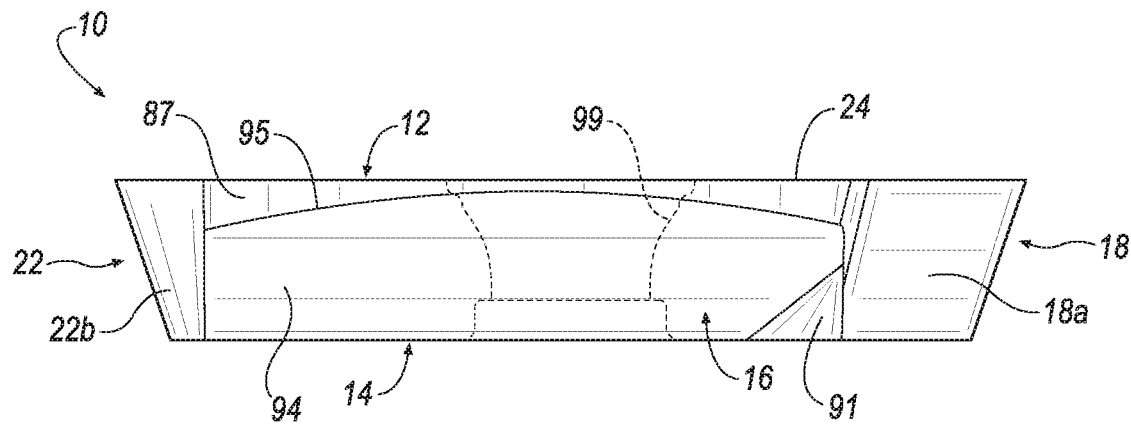
FIG. 2 shows a side elevational view of the cutting insert of FIG. 1.

Referring to FIGS. 1 and 2, to facilitate insertion and removal of the cutting insert 10 in an insert pocket described below, a countersunk bore 99 is provided extending from the top surface 12 to the bottom surface 14 of the cutting insert 10, and preferably located in the central portion 48 of the top surface 12 of the cutting insert 10.

Figure 6:
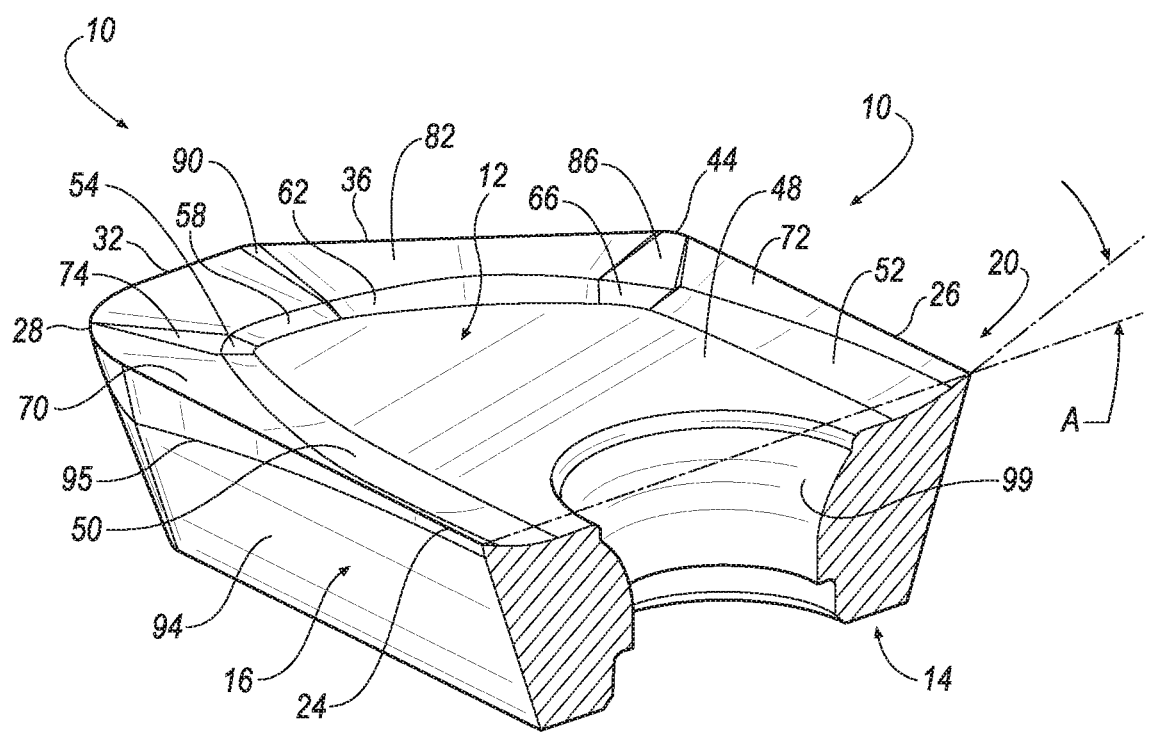
FIG. 6 shows a cross-sectional view of the cutting insert taken along line 6-6 of FIG. 1.

One aspect of the invention is that the topography of the top surface 12 of the cutting insert 10 is designed for high-speed milling operations of a metallic work piece, such as aluminum, and the like. Specifically, the rake faces 70, 72 that extend from the radius blends 50, 52 to the long cutting edges 24, 26 of the cutting insert 10 slope upwardly at an angle in a range of approximately fifteen (15) to twenty-five (25) degrees, for example, at an angle, A, of approximately twenty (20) degrees with respect to the planar central portion 48 of the top surface 12 (and also the bottom surface 14), as shown in FIG. 6. This upward angle is designed to provide improved chip formation and cutting action for the cutting insert 10. In addition, the rake faces 74, 76 that extend from the radius blends 54, 56 to the corner radius cutting edges 28, 30, the rake faces 78, 80, the rake faces 82, 84 and the rake faces 90, 92 slope upwardly at a relatively smaller angle, for example, at an angle in the range of approximately five (5) to fifteen (15) degrees with respect to the central portion 48 of the top surface 12. For example, the rake faces 74, 76 that extend from the radius blends 54, 56 to the corner radius cutting edges 28, 30 may slope upward at an angle of approximately seven (7) degrees. In another example, the rake faces 82, 84 that extend from the radius blends 58, 60 to the facet radius cutting edges 32, 34 may slope upward at an angle of approximately ten (10) degrees. In yet another example, the rake faces 86, 88 that extend from the radius blends 62, 64 to the ramping cutting edges 36, 38 may slope upward at an angle of approximately eleven (11) degrees. In still yet another example, the rake faces 90, 92 that extend from between the radius blends 58, 60, 62, 64 to the transitional edges or radial reliefs 40, 42, 44, 46 may slope upward at an angle of approximately nine (9) degrees. These upward angles are designed to provide stronger corner radius cutting edges 28, 30, stronger facet radius cutting edges 32, 34, and stronger ramp cutting edges 36, 38, as compared to conventional cutting inserts. It will be appreciated that the invention is not limited by the amount that the rake faces slope upwardly from its respective blend radius to its respective cutting edge, and that the invention can be practiced with any desirable amount of angle to provide improved chip formation and strength. Thus, the topography of the top surface 12 of the cutting insert 10 of the invention is such that the central portion 48 is substantially planar and lowest in elevation that gradually slopes upward in a concave fashion to the cutting edges 24, 26, 28, 30, 32, 34, 36, 38. Although other variations are possible, it should be noted that the amount of upward slope at each cutting edge is inversely proportional to the distance from the central portion 48 to the respective cutting edge. For example, the distance between the central portion 48 and the cutting edges 24, 26 is the shortest, but the cutting edges 24, 26 have the greatest amount of upward slope, whereas the distance between the central portion 48 and the cutting edges 28, 30 is the greatest, but the cutting edges 28, 30 have the least amount of upward slope.

As illustrated in FIGS. 1-6, the cutting insert 10 preferably, but not necessarily, includes the above-described cutting edges, rake faces, radius blends and other features at diagonally opposite corners. Thus, the cutting insert 10 is indexable and is mirror symmetric along a line passing through the ramping cutting edges 36, 38, or a line passing through the long cutting edges 24, 26. This mirror symmetry of the cutting insert 10 permits the cutting insert 10 to be used twice by rotating the cutting insert approximately 180 degrees before disposal.

Figure 3:
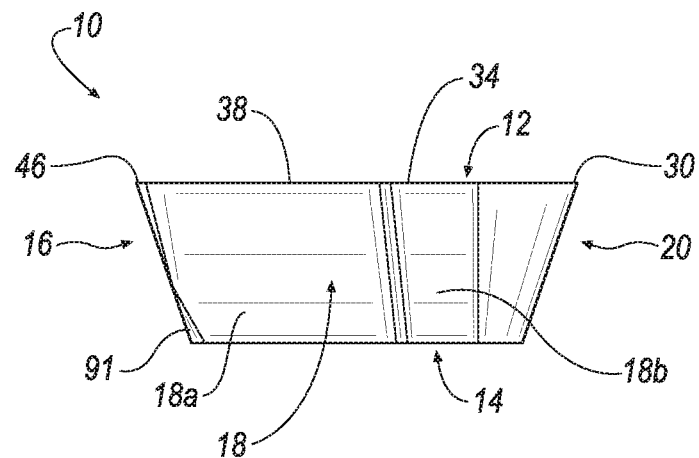
FIG. 3 shows an end view of the cutting insert of FIG. 1.
Figure 4:
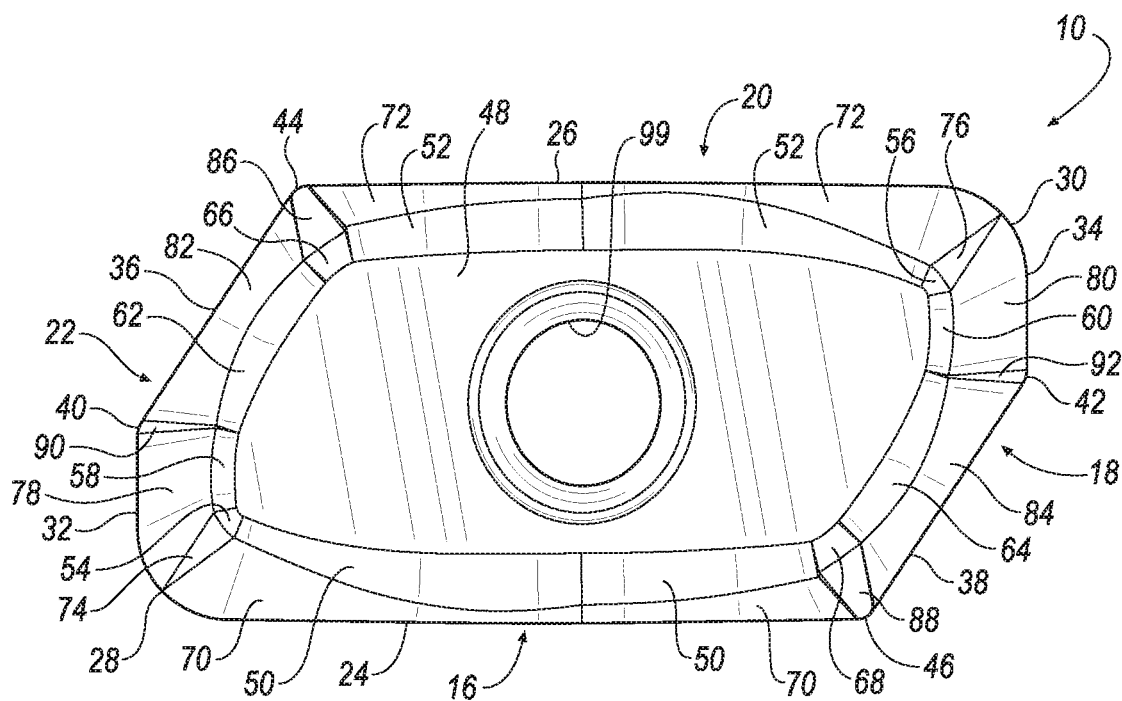
FIG. 4 shows a top view of the cutting insert of FIG. 1.
Figure 5:
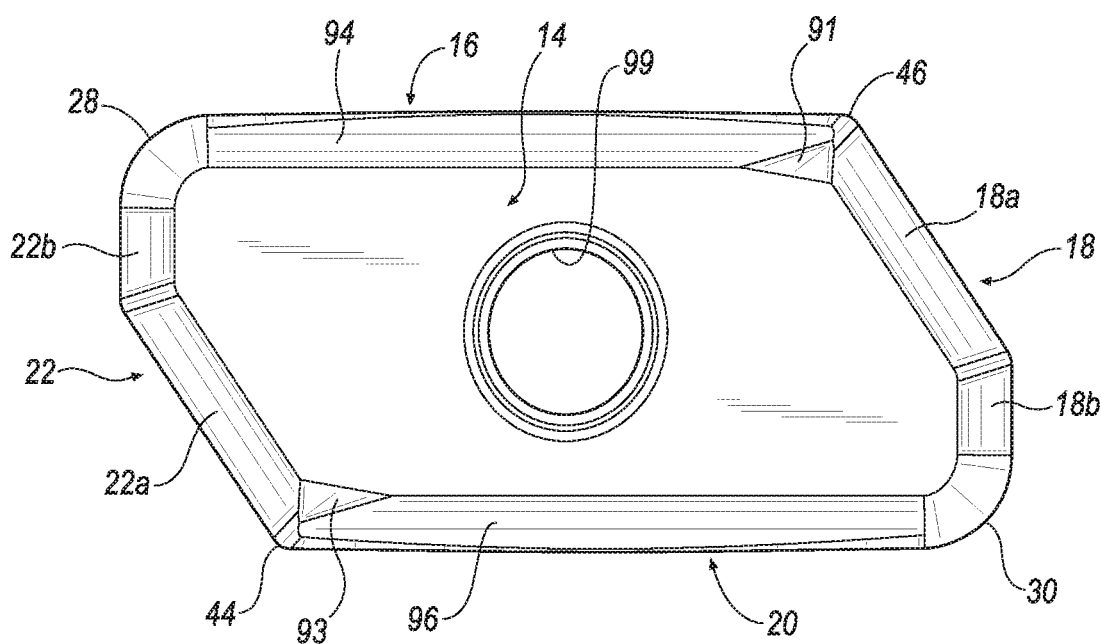
FIG. 5 shows a bottom view of the cutting insert of FIG. 1.
Figure 7:
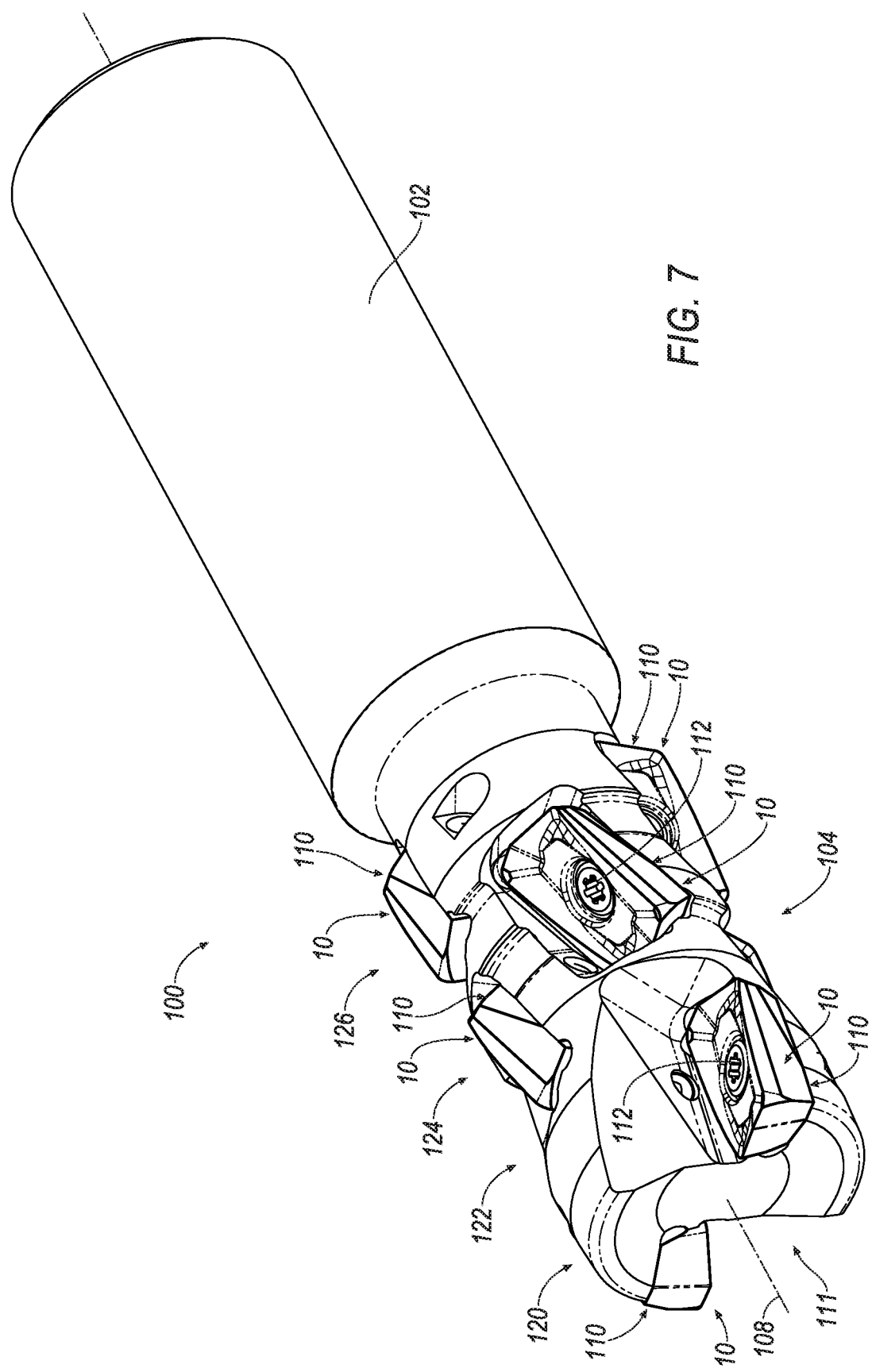
FIG. 7 shows a perspective view of a compression milling cutter according to an embodiment of the invention.

As shown in FIGS. 2 and 5, the side surfaces 16, 20 preferably, but not necessarily, include an angled flat surface 94, 96, respectively, extending from the bottom surface 14, as seen in FIGS. 3 and 4. Each angled flat surface 92, 94 include a radiused upper edge 95, 97, respectively. The flat surfaces 94, 96 act as a primary relief surface for seating the insert 10 in the pocket of the milling cutter, as shown in FIG. 7. The radiused upper edges 95, 97 facilitate in the formation of ninety (90) degree cylindrical walls on the work piece, as is commonly used in the art. In addition, the side surfaces 16, 20 include an upper surface 87, 89 extending between the radiused upper edges 95, 97, respectively, and the long cutting edges 24, 26, respectively. Further, the side surfaces 16, 20 include a faceted surface 91, 93 extending between the bottom surface 14 and the flat surfaces 94, 96, respectively.

Figure 8:
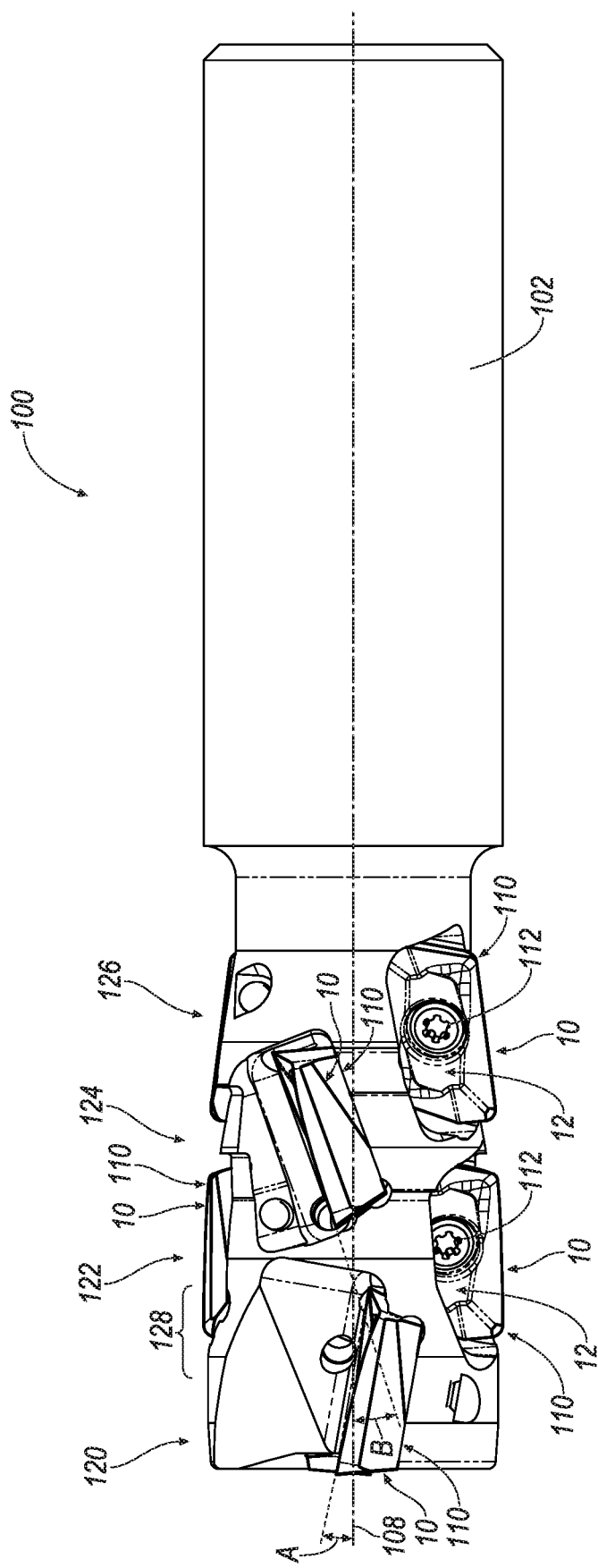
FIG. 8 shows a side view of the compression milling cutter of FIG. 7.
Figure 9:
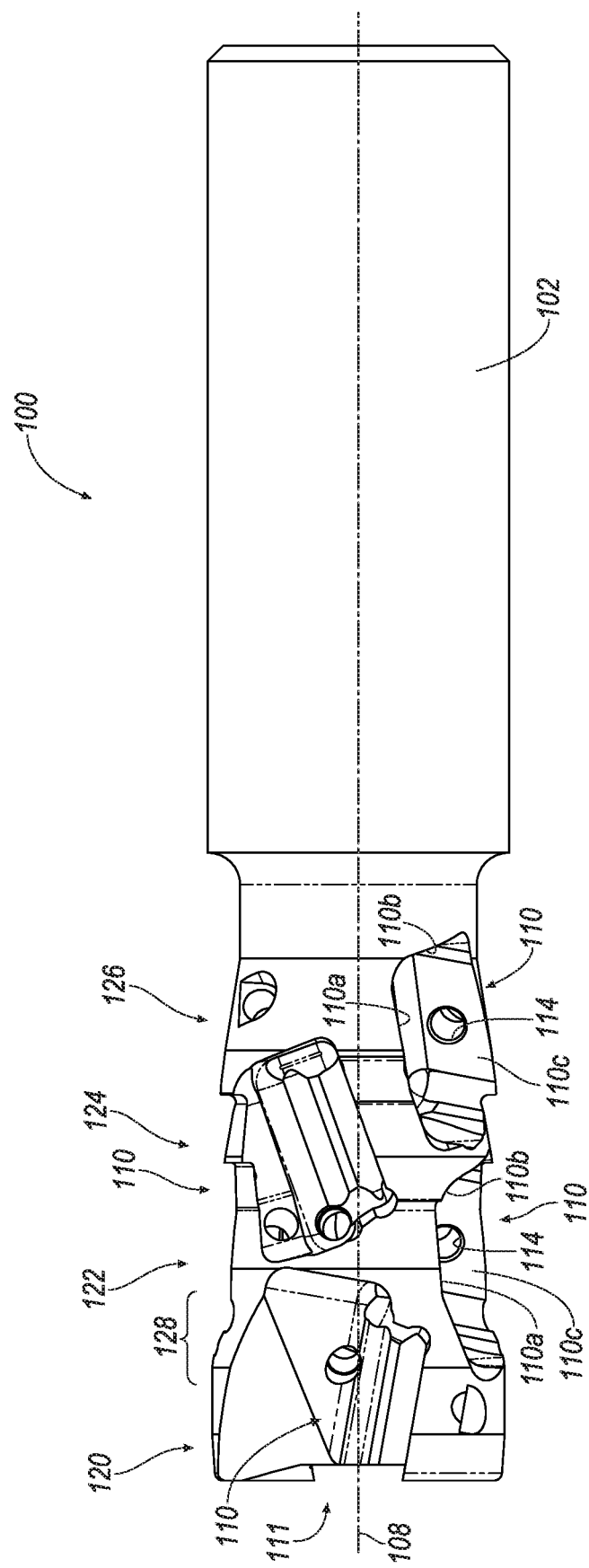
FIG. 9 is a side view of the compression milling cutter of FIG. 7 with the cutting inserts removed for clarity.

Referring now to FIGS. 7-9, a compression milling cutter 100 for use with the cutting insert 10 is shown according to an embodiment of the invention. In general, the compression milling cutter 100 includes a shank 102, a front cutting portion 104 and a transition surface 106 between the shank 102 and the front cutting portion 104. The cutter 100 is preferably made from heat-treated steel, such as H13 tool steel, or other materials known to those skilled in the art. The specific material used will vary as a consequence of desired design characteristics of the cutter 100. The cutter 100 defines a rotational axis 108. The compression milling cutter 100 also includes at least two insert receiving pockets, shown generally at 110, formed in the front cutting portion 104 of the compression milling cutter 100.

To mount the cutting insert 10 in the insert receiving pocket 110, the bottom surface 110c of the insert receiving pocket 110 may include a threaded bore 114 (FIG. 9) that is substantially aligned with the countersunk bore 99 of the cutting insert 10 when the cutting insert 10 is properly mounted in the insert receiving pocket 110. The threaded bore 114 is sized and positioned to threadably receive a threaded fastener 112, such as a retainer screw or the like, positioned in the countersunk bore 99, whereby the insert 10 may be securely, but releasably mounted in the insert receiving pocket 110. When mounted in the insert receiving pocket 110, the bottom surface 14 of the cutting insert 10 engages the bottom surface 110c of the insert pocket 110. In addition, the side surfaces 18, 20 (or 16, 22 depending on which orientation the cutting insert 10 is mounted in the insert receiving pocket 110) of the cutting insert 10 engage the side surfaces 110a, 110b of the insert receiving pocket 110, respectively, to firmly secure the cutting insert 10 in the insert receiving pocket 110.

As shown in FIGS. 7-9, the insert receiving pockets 110 of the indexable milling cutter 100 are arranged in a plurality of circumferential rows. For example, the indexable milling cutter 100 of the illustrated embodiment has a first row 120 having one or more insert receiving pockets 110 adjacent or proximate a leading end 111 of the milling cutter 100, a second circumferential row 122 having one or more insert receiving pockets 110 adjacent the first circumferential row 120, a third circumferential row 124 having one or more insert receiving pockets 110 adjacent the second circumferential row 122, and a fourth circumferential row 126 having one or more insert receiving pockets 110 adjacent the third circumferential row 124. It should be appreciated that the invention is not limited by the number of circumferential rows 120, 122, 124, 126 of one or more insert receiving pockets 110, and that the invention can be practiced with any number of rows, so long as the milling cutter 100 has at least two circumferential rows of insert receiving pockets 110 (i.e., the first row 120 proximate the leading end 111 and a second row 122 adjacent the first row 120), depending on the dimensions of the milling cutter 100.

In the illustrated embodiment, each circumferential row 120, 122, 124, 126 of the milling cutter 100 includes two cutting inserts 10 spaced about 180 degrees apart from each other. However, it will be appreciated that the invention can be practiced with a cutting tool having any desirable of cutting inserts 10 in each circumferential row. For example, the milling cutter 100 can have one cutting insert 10 in each circumferential row 120, 122, 124, 126, or more than two cutting inserts 10 in each circumferential row 120, 122, 124, 126.

It will be appreciated that the compression milling cutter 100 may include one or more helical flutes (not shown) disposed between the insert pockets 110. The helical flutes aid in the evacuation of chips during the machining process.

One aspect of the invention is that the cutting inserts 10 mounted in the first circumferential row 120 of insert pockets 110 (i.e., the row proximate the leading end 111) are mounted with a positive axial rake angle, A, with respect to the rotational axis 108 and the cutting inserts 10 mounted in the subsequent rows 122, 124, 126 are mounted with a negative axial rake angle, B, with respect to the rotational axis 108, as shown in FIG. 8. In other words, only the cutting inserts 10 mounted in the first circumferential row 120 are mounted with a positive axial rake angle, A, and the cutting inserts 10 mounted in the remainder of the compression milling cutter 100 are mounted with a negative axial rake angle, B.

It will be appreciated that the cutting inserts 10 mounted in the first circumferential row 120 can have identical positive axial rake angles, A, or one or more cutting inserts 10 can have different positive axial rake angles, A. For example, a cutting insert 10 mounted in the first circumferential row 120 can have a positive axial rake angle, A, of about 25 degrees, and a different cutting insert 10 mounted in the first circumferential row 120 can have a same or different positive axial rake angle, A.

It will also be appreciated that the cutting inserts mounted in the second circumferential row can have the same or different negative axial rake angle, B, than the cutting inserts mounted in subsequent rows (i.e., rows 124, 126, etc.). In addition, cutting inserts 10 mounted within the same circumferential row can have the same or different negative axial rake angles, B. For example, one or more cutting inserts 10 mounted in the second circumferential row 122 may have a negative axial rake angle, B, of about −25 degrees, while one or more cutting inserts mounted in the third circumferential row 124 have a negative axial rake angle, B, of about −20 degrees. In another example, a cutting insert 10 mounted in the second circumferential row 122 can have a negative axial rake angle, B, of about −25 degrees, and a different cutting insert 10 mounted in the second circumferential row 122 can have the same or different negative axial rake angle, B.

In one embodiment, the one or more cutting inserts 10 mounted in the one or more insert pockets 110 of the first circumferential row 120 of the compression milling cutter 100 are mounted at a positive axial rake angle, A, in a range between about greater than 0 degrees and less than about 35 degrees. In other words, 0 degrees<A<35 degrees. On the other hand, the one or more cutting inserts 10 mounted in the one or more insert pockets 110 of the second circumferential row 122 of the compression milling cutter 100 are mounted at a negative axial rake angle, B, in a range between about less than 0 degrees and greater than about −35 degrees. In other words, −35 degrees<B<0 degrees.

Figure 10:
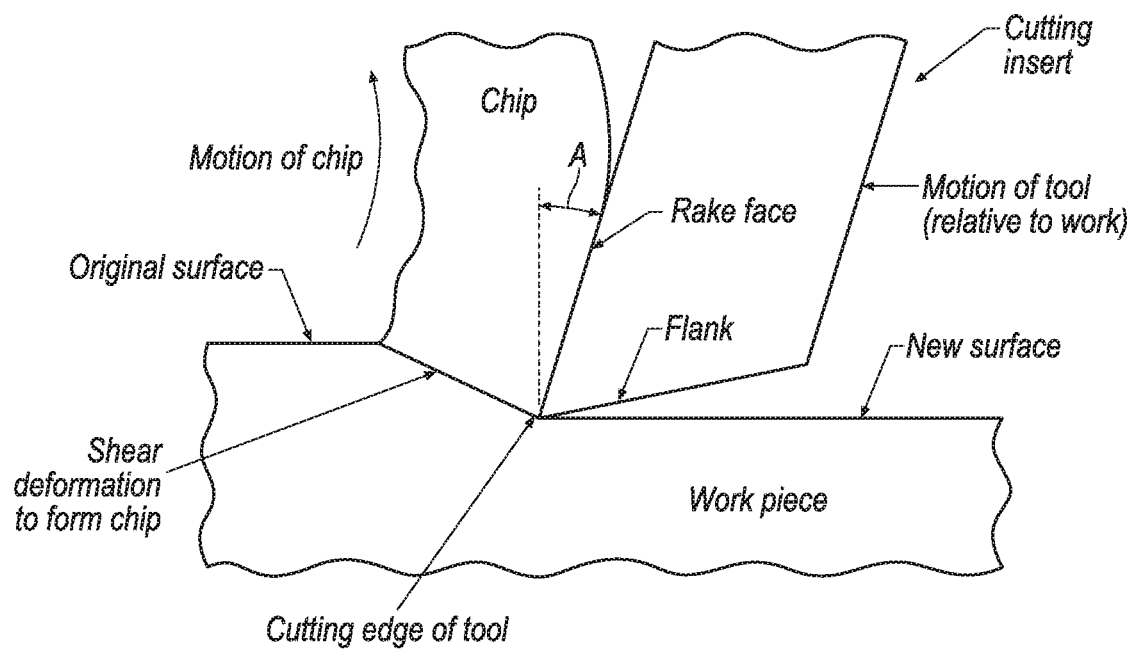
FIG. 10 is a schematic diagram of a cutting insert engaging a work piece with a positive axial rake angle.
Figure 11:
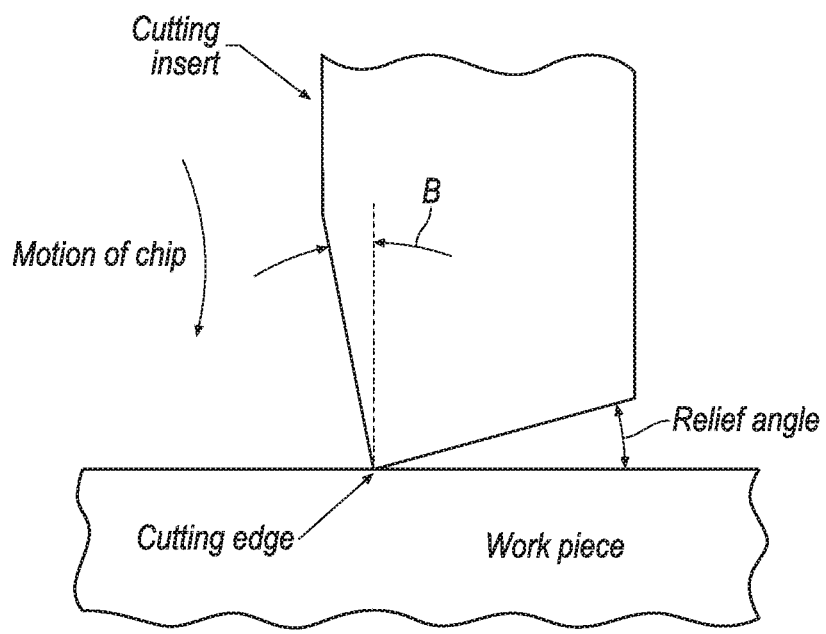
FIG. 11 is a schematic diagram of a cutting insert engaging a work piece having a negative axial rake angle.

As shown in FIG. 10, a cutting insert 10 mounted in the first circumferential row 120 with the positive axial rake angle, A, guides the chip in a first or upward direction (as indicated by the arrow). As shown in FIG. 11, a cutting insert 10 mounted in subsequent circumferential rows 122, 124, 126 with the negative axial rake angle, B, guides the chip in a second or downward opposite the first direction (as indicated by the arrow).

Referring back to FIGS. 7-9, this movement of chips in opposite directions creates a compression zone 128 located between the first and second circumferential rows 120, 122, which replicates the cutting action of a solid end mill, particularly when machining FRP materials, as compared to conventional solid ends. However, because the compression milling cutter 100 has indexable cutting inserts 10, the compression milling cutter 100 of the invention is much more cost effective than a conventional solid end mill, while replicating the cutting action of the solid end mill, particularly when machining FRP materials.

The patents and publications referred to herein are hereby incorporated by reference.

Having described presently preferred embodiments the invention may be otherwise embodied within the scope of the appended claims.

What is claimed is:

1. A compression milling cutter for machining a laminated material, said compression milling cutter comprising:
   a front cutting portion having a first circumferential row of one or more insert receiving pockets proximate a leading end of the milling cutter, and a second circumferential row of one or more insert receiving pockets, each insert receiving pocket configured to receive a respective indexable cutting insert;
   wherein the indexable cutting insert mounted in an insert pocket of the first circumferential row has a positive axial rake angle, A, with respect to a rotational axis such that a chip generated during an operation of machining a laminated material is guided in a first direction,
   wherein the indexable cutting insert mounted in an insert pocket of the second circumferential row has a negative axial rake angle, B, with respect to the rotation axis such that a chip generated during the operation of machining a laminated material is guided in a second direction opposite the first direction, thereby creating a compression zone disposed between the first and second circumferential rows, and
   wherein the indexable cutting insert mounted in an insert pocket of the first circumferential row and the indexable cutting insert mounted in an insert pocket of the second circumferential row are disposed along a helix with respect to one another.

2. The compression milling cutter of claim 1, wherein the positive axial rake angle, A, is greater than 0 degrees and less than 35 degrees.

3. The compression milling cutter of claim 1, wherein the negative axial rake angle, B, is less than 0 degrees and greater than −35 degrees.

4. The compression milling cutter of claim 1, wherein the first circumferential row includes at least two cutting inserts.

5. The compression milling cutter of claim 4, wherein a first cutting insert mounted in the first circumferential row has a first positive axial rake angle, A, and wherein a second cutting insert of the first circumferential row has a second positive axial rake angle, A.

6. The compression milling cutter of claim 5, wherein the first positive axial rake angle, A, is identical to the second positive axial rake angle, A.

7. The compression milling cutter of claim 5, wherein the first positive axial rake angle, A, is different than the second positive axial rake angle, A.

8. The compression milling cutter of claim 1, wherein the second circumferential row includes at least two cutting inserts.

9. The compression milling cutter of claim 8, wherein a first cutting insert mounted in the second circumferential row has a first negative axial rake angle, B, and wherein a second cutting insert of the second circumferential row has a second negative axial rake angle, B.

10. The compression milling cutter of claim 9, wherein the first negative axial rake angle, B, is identical to the second negative axial rake angle, B.

11. The compression milling cutter of claim 9, wherein the first negative axial rake angle, B, is different than the negative axial rake angle, B.

12. The compression milling cutter of claim 1, further comprising a third circumferential row of one or more insert receiving pockets, each insert receiving pocket configured to receive a respective indexable cutting insert.

13. The compression milling cutter of claim 12, wherein a first cutting insert mounted in the second circumferential row has a first negative axial rake angle, B, and wherein a second cutting insert is mounted in the third circumferential row at a second negative axial rake angle, B.

14. The compression milling cutter of claim 13, wherein the first negative axial rake angle, B, is identical to the second negative axial rake angle, B.

15. The compression milling cutter of claim 13, wherein the first negative axial rake angle, B, is different than the second negative axial rake angle, B.

16. The compression milling cutter of claim 1, further comprising a shank and a transition surface between the shank and the front cutting portion.

17. The compression milling cutter of claim 1, wherein the indexable cutting insert comprises:
   a top surface having a substantially planar central portion, a substantially planar bottom surface, and a plurality of side surfaces;
   a long cutting edge defined at an intersection between the top surface and one of the side surfaces;
   a corner radius cutting edge defined at an intersection between the top surface and one of the side surfaces;
   a facet radius cutting edge defined at an intersection between the top surface and one of the side surfaces; and
   a ramping cutting edge defined at the intersection between the top surface and one of the side surfaces.

18. A compression milling cutter for machining a laminated material, said compression milling cutter comprising:
   a front cutting portion having a first circumferential row having at least two insert receiving pockets proximate a leading end of the milling cutter, and a second circumferential row having at least two insert receiving pockets proximate the first circumferential row, each insert receiving pocket configured to receive a respective indexable cutting insert;
   wherein a first cutting insert mounted in the first circumferential row has a first positive axial rake angle, A, and wherein a second cutting insert of the first circumferential row has a second positive axial rake angle, A, such that chips generated by the first and second cutting inserts during an operation of machining a laminated material are guided in a first direction,
   wherein a third cutting insert mounted in the second circumferential row has a first negative axial rake angle, B, and wherein a fourth cutting insert of the second circumferential row has a second negative axial rake angle, B, such that chips generated by the third and fourth cutting inserts during the an operation of machining a laminated material are guided in a second direction opposite the first direction, thereby creating a compression zone disposed between the first and second circumferential rows, and
   wherein the first cutting insert mounted in the first circumferential row and the third indexable cutting insert mounted in the second circumferential row are disposed along a helix with respect to one another.

19. The compression milling cutter of claim 18, wherein the first positive axial rake angle, A, is different than the second positive axial rake angle, A.

20. The compression milling cutter of claim 18, wherein the first negative axial rake angle, B, is different than the second negative axial rake angle, B.

21. The compression milling cutter of claim 1, wherein the operation of machining a laminated material is an operation of machining a FRP material.

22. The compression milling cutter of claim 1, wherein the operation of machining a laminated material replicates a cutting action of a solid end mill in machining a laminated material.

23. The compression milling cutter of claim 1, comprising one or more helical flutes.

\* \* \* \* \*